(12) United States Patent
Bharathram et al.

(10) Patent No.: US 11,894,981 B1
(45) Date of Patent: Feb. 6, 2024

(54) SYSTEMS AND METHODS FOR GENERATING SOAR PLAYBOOKS

(71) Applicant: Fortinet, Inc., Sunnyvale, CA (US)

(72) Inventors: BK Bharathram, Burnaby (CA); Abhishek Narula, Pune (IN); Pooja Singh, Pune (IN)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 17/901,069

(22) Filed: Sep. 1, 2022

(51) Int. Cl.
*H04L 41/12* (2022.01)
*H04L 41/22* (2022.01)
*H04L 41/14* (2022.01)

(52) U.S. Cl.
CPC .............. *H04L 41/12* (2013.01); *H04L 41/14* (2013.01); *H04L 41/22* (2013.01)

(58) Field of Classification Search
CPC .......... H04L 41/12; H04L 41/14; H04L 41/22
See application file for complete search history.

(56) References Cited

U.S. PATENT DOCUMENTS

2020/0076710 A1\* 3/2020 Leon-Garcia ......... H04L 47/125
2020/0344249 A1\* 10/2020 Mohan .................... H04L 63/20

OTHER PUBLICATIONS

Cybersponse Adaptive Security: "What is Security Orchestartion? Why Do I Need It?".
Laskowski "Integrated Adaptive Cyber Defense (IACD) BPMN XML Mapping to Visual Reference for Sharable Workflow" Johns Hopkins Applied Physics Lab. Aug. 2017.
IACD "Integrated Cyber" Johns Hopkins University Applied Physics Labratory https://static1.squarespace.com/static/5a94b67ff93fd440f0516297/t/5bd4bb04f4e1fc41817e67, Oct. 2, 2018.
IACD "Sharable Workflow Concept" https://www.youtube.com/watch?v=sG1S3BlpqrM printed on May 15, 2023.
"Incident Response: Community Driven Conference for All Levels of Cyberscurity Professionals" https://www.incidentresponse.com/IR18DC, printed on May 24, 2023.

\* cited by examiner

*Primary Examiner* — Gil H. Lee
(74) *Attorney, Agent, or Firm* — Jaffery Watson Mendonsa & Hamilton LLP

(57) ABSTRACT

Various approaches are discussed for generation of SOAR playbooks using a variety playbook sources.

17 Claims, 6 Drawing Sheets

SYSTEMS AND METHODS FOR GENERATING SOAR PLAYBOOKS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2021, Fortinet, Inc.

FIELD

Embodiments of the present invention generally relate to generation of SOAR playbooks using a variety playbook sources.

BACKGROUND

A great deal of human effort has been applied to developing processes in relation to network monitoring and maintenance. Such efforts are often not transferrable as new processes and/or systems are brought online. A new approach called "Security Orchestration, Automation, and Response" (SOAR) has become popular. In such SOAR based systems the ability to use an automation framework effectively to orchestrate network actions is important. To this end, a SOAR implementation relies on playbooks to control the automation. In some cases, such playbooks are a visual representation of a process framework. As a SOAR based system is implemented, network personnel are required to implement old processes as SOAR playbooks. This can be expensive and time consuming.

Thus, there exists a need in the art for more advanced approaches, devices and systems for implementing and deploying previously developed network processes in a SOAR based system.

SUMMARY

Embodiments of the present invention generally relate to generation of SOAR playbooks using a variety playbook sources.

This summary provides only a general outline of some embodiments. Many other objects, features, advantages and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

DETAILED DESCRIPTION

Figure 1A:
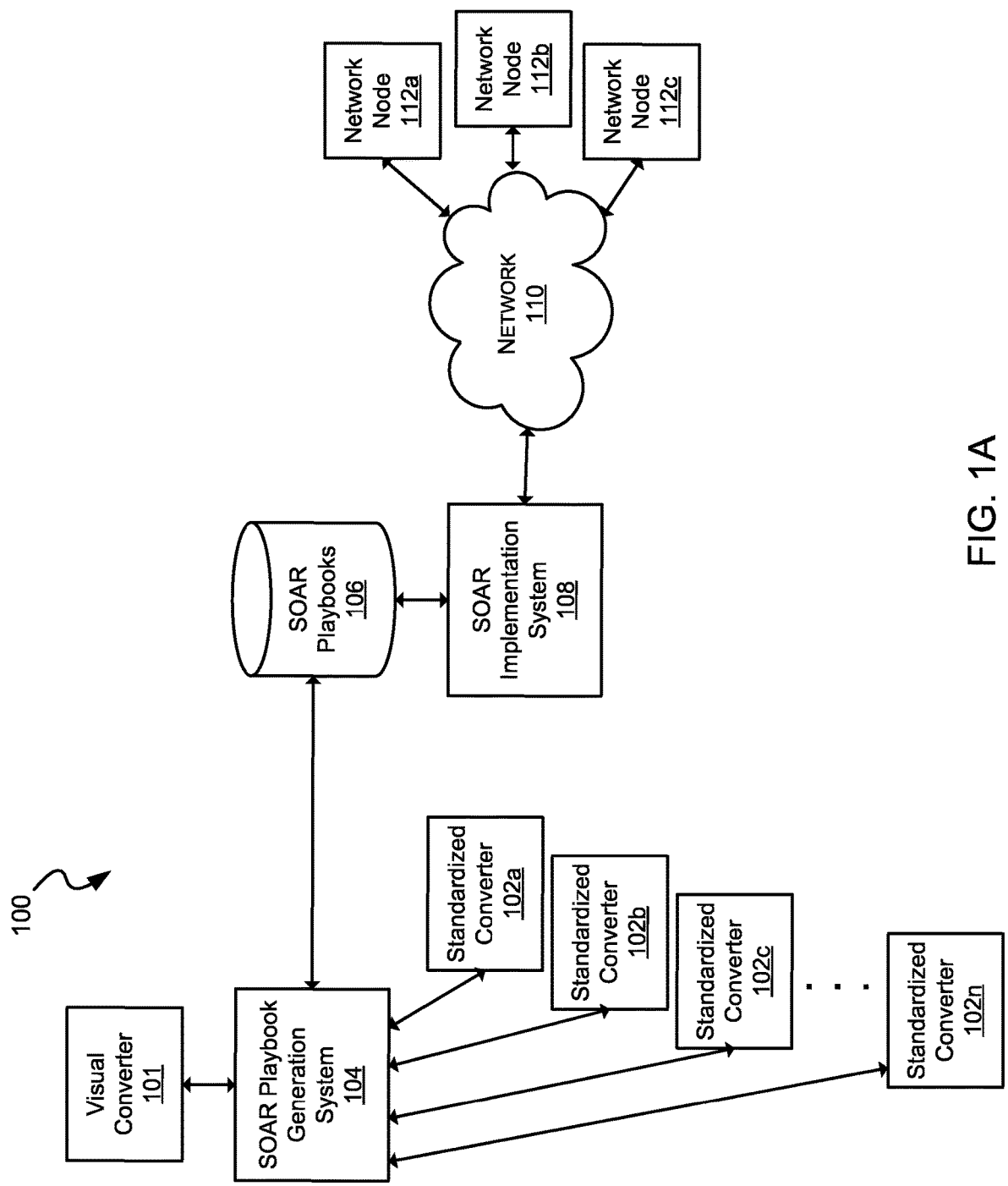
FIGS. 1A-1C illustrate a SOAR implementation system configured to execute SOAR playbooks generated by a SOAR generation system in accordance with some embodiments.

Embodiments of the present invention generally relate to generation of SOAR playbooks using a variety playbook sources.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The term "daemon" is used in its broadest sense to mean a set of instructions executable by a processing resource that runs as a background process to perform defined tasks. Based upon the disclosure provided herein, one of ordinary skill in the art will recognize a variety of daemons that may be used in relation to different embodiments.

The phrase "network element malfunction" is used in its broadest sense to mean any malfunction within a network environment including, but not limited to: a failure of a network server; a failure of a cloud based service; a failure of an endpoint device; a failure of a software application executing on a device in the network such as, for example, a network server or an endpoint device; and/or a failure of a downstream provider. Based upon the disclosure provided herein, one of ordinary skill in the art will recognize a myriad of malfunctions that may be considered a network element malfunction.

The phrase "automated remediation" is used in its broadest sense to mean one or more actions that are automatically employed as part of diagnosing and/or mitigating a network condition based upon the occurrence of a condition set. For example, where it is detected that the CPU usage of a network device has exceeded a defined threshold for a defined period (i.e., the condition set), the automated remediation may be to assign an incident lead and log the incident lead into the particular network device. Such an automated remediation that automatically connects an incident lead and provides status may be referred to herein as a "diagnostic automated remediation". As another example, where it is detected that the memory usage of a network device has exceeded a defined threshold for a defined period (i.e., the condition set), the automated remediation may be to automatically restart the network device and send a message to an incident lead identifying the conditions surrounding the incident. As yet another example, where it is detected that the CPU usage of a network device has exceeded a defined threshold for a defined period (i.e., the condition set), the automated remediation may be to automatically stop a process executing on the network device that is using significant CPU bandwidth. Such automated remediations that automatically modify the operation of one or more network devices may be referred to herein as an "active automated remediation". Such automated remediations may be pre-programmed solutions that a user selects to automatically execute whenever one or more metrics (i.e., a condition set) match a pre-programmed threshold. Based upon the disclosure provided herein, one of ordinary skill in the art will recognize a variety of automated remediations, both diagnostic and active, that may be employed in relation to different embodiments. Further, based upon the disclosure provided herein, one of ordinary skill in the art will recognize a variety of condition sets that may be used to trigger automated remediations in relation to different embodiments.

The phrase "processing resource" is used in its broadest sense to mean one or more processors capable of executing instructions.

Some embodiments provide methods for generating a Security Orchestration, Automation, and Response (SOAR) playbook. Such methods include: receiving, by a processing resource, a visual representation of a network process; converting, by the processing resource, the visual representation of the network process to an intermediate format; mapping, by the processing resource, each element of the intermediate format to a manual SOAR operation to yield a manual SOAR playbook representing the network process; and converting, by the processing resource, at least one element of the manual SOAR playbook to an automated SOAR operation to yield an automated SOAR playbook.

In some instances of the aforementioned embodiments, the intermediate format is a Java Script Object Notation format. In various instances of the aforementioned embodiments, converting the visual representation of the network process to the intermediate format uses a visual based conversion. In some such instances, the visual based conversion includes: identifying, by the processing resource, a first shape on the visual representation of the network process; automatically recognizing, by the processing resource, a first text on the first shape; generating, by the processing resource, an action including the first shape and the first text; including, by the processing resource, the action in the intermediate format; identifying, by the processing resource, a second shape on the visual representation of the network process; automatically recognizing, by the processing resource, a second text on the second shape; generating, by the processing resource, a decision including the second shape and the second text; and including, by the processing resource, the decision in the intermediate format in a connected relationship with the action. In some cases the first shape is a rectangle and the second shape is a diamond.

Other embodiments provide systems for generating a Security Orchestration, Automation, and Response (SOAR) playbook. Such systems include: a processing resource, and a non-transient computer readable medium coupled to the processing resource. The non-transient computer readable medium has stored therein instructions that when executed by the processing resource cause the processing resource to: receive a visual representation of a network process; convert the visual representation of the network process to an intermediate format; map each element of the intermediate format to a manual SOAR operation to yield a manual SOAR playbook representing the network process; and convert at least one element of the manual SOAR playbook to an automated SOAR operation to yield an automated SOAR playbook.

Yet other embodiments provide non-transient computer readable medium including instructions that when executed by a processing resource cause: receiving a visual representation of a network process; converting the visual representation of the network process to an intermediate format; mapping each element of the intermediate format to a manual SOAR operation to yield a manual SOAR playbook representing the network process; and converting at least one element of the manual SOAR playbook to an automated SOAR operation to yield an automated SOAR playbook.

Turning to FIG. 1A, a SOAR implementation system 108 is shown that is configured to execute SOAR playbooks 106 generated by a SOAR generation system 104 in accordance with some embodiments. SOAR implementation system 108 applies SOAR technology to coordinate, execute, and automate tasks ongoing between various individuals and network tools all within a single platform. Such a comprehensive coordination and execution allows organizations to respond efficiently to attacks on a network or networks overseen by SOAR implementation system 108, and also to observe network behaviors and thereby to better understand future incidents. Such a comprehensive approach operates to improve an overall network security posture.

During operation, SOAR implementation system 108 ingests a variety of network alert data. As network alert data is received, SOAR implementation system 108 identifies one or more SOAR playbooks 106 to be executed in the event of a defined occurrence indicated by the network alert. Such SOAR playbooks 106 represent a recipe of actions that can or should be taken for a given network alert or group of network alerts. SOAR playbooks 106 automate/orchestrate response workflows taken in relation to a protected network or group of protected networks. Using a combination of human and machine learning, organizations are able to analyze this diverse data in order to comprehend and prioritize automated incident response actions to any future threats, thus creating a more efficient and effective approach to handling network security operations.

As an example, such SOAR playbooks 106 may include a number of processes that are to be executed in relation to one or more network nodes 112 (i.e., network node 112*a*, network node 112*b*, or network node 112*c*) over a network 110. Network 110 may be any type of network or combination of networks. For example, networks 110 may include a combination of a home network accessed by a user device; a corporate network that connects nodes 112; and/or the Internet connecting the home network to the corporate network. As another example, network 110 may be a single corporate network. Further, those skilled in the art will appreciate that network 110 can be: a wireless network, a wired network or a combination thereof that can be implemented as one of the various types of networks, such as an Intranet, a Local Area Network (LAN), a Wide Area Network (WAN), an Internet, and/or the like. Further, network 110 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like. Based upon the disclosure provided herein, one of ordinary skill in the art will recognize a variety of network types, network combinations, and/or connections that may be included as part of network 110. It is also noted that while SOAR implementation system 108 is shown operating in relation to a single network, that SOAR implementation system 108 may be configured to operate in relation to two or more distinct networks over which SOAR implementation system has been configured to operate.

Network processes have been developed for decades using different tools in an effort to make reactions to a network alert quicker and more effective. Such network processes have been developed using a number of tools including, but not limited to, hand-drawn flow charts, electronically drawn flow charts generated using, for example, Lucid™ charts, Microsoft Visio™, Microsoft Word™, Whiteboard Image, a Business Process Modelling Notation, Microsoft PowerPoint™, and the like. Such network processes are developed and tested over time, and represent a significant human effort which would be lost if/when an organization replaces its network monitoring using a SOAR based system relying on SOAR playbooks.

To avoid this, various embodiments utilize SOAR generation system 104 which is configured to receive network processes in a number of formats, and to transition those network processes to automated SOAR playbooks. In particular, SOAR generation system 104 is configured to receive a network process. SOAR generation system 104 determines in what type of format the network process has been represented, and selects a standardized converter 102 (i.e., standardized converter 102*a*, standardized converter 102*b*, standardized converter 102*c*, or standardized converter 102*n*) to convert the network process to an intermediate format. As an example, the intermediate format bay be a "Java Script Object Notation" (JSON) format. Based upon the disclosure provided herein, one of ordinary skill in the art will recognize a variety of formats that may be used as the intermediate format in accordance with different embodiments. Converters 102 could use third party integration software development kits (SDK) to convert the flowchart images into corresponding JSONs recognized by the SOAR specific workflow engine.

Each of the standardized converters 102 is configured to accept a network process in a defined format, and to provide an equivalent network process in the intermediate format. As just some examples, standardized converters may be implemented specific to a Lucid™ charts format, and others implemented specific to a Microsoft Visio™ format and a Microsoft Word™ format. Based upon the disclosure provided herein, one of ordinary skill in the art will recognize a variety of formats for which standardized converters 102 may be designed for in accordance with different embodiments.

Where a standardized converter 102 is not available for the received network process, SOAR generation system 104 uses a visual converter 101. Visual converter 101 operates on an image of the network process and does not rely on the format of the tool originally used to prepare the network process. In some embodiments, visual converter 101 is configured to recognize standard flowchart shapes as execution steps (e.g., a rectangle), as decision steps (i.e., a diamond), process beginning and ending steps (e.g., a rounded rectangle), and the like. Further, visual converter 101 includes an automated text recognition tool capable of recognizing language and reducing the text language to electronic characters. After reading the shapes and language on the network process, visual converter 101 reduces the information to the intermediate format representing the received network process. In some embodiments, the intermediate format is a JavaScript Object Notation (JSON) format. Based upon the disclosure provided herein, one of ordinary skill in the art will recognize a variety of intermediate formats that may be used in relation to different embodiments. The intermediate format is then converted to a manual SOAR playbook, and subsequently the manual SOAR playbook is modified to include one or more automated SOAR processes in place of respective processes in the manual SOAR playbook. In some embodiments, visual converter 101 uses image recognition techniques included in PyTorch to identify the flowchart components.

Figure 1B:
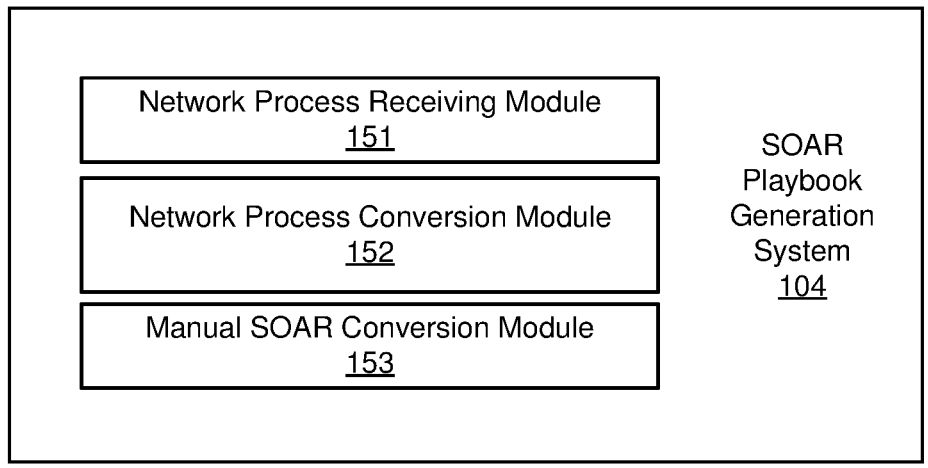

Turning to FIG. 1B, an implementation of SOAR generation system 104 is shown in accordance with some embodiments. As shown, SOAR generation system 104 includes: a network process receiving module 151, a network process conversion module 152, and manual SOAR conversion module 153.

Network process receiving module 151 is configured to receive a network process. The network process may be any set of instructions that are followed when a particular occurrence or set of occurrences are noted by a network administrator. As an example, the network process may be a Microsoft™ Visio™ flow chart having a number of rectangles indicating different steps to be taken and a number to diamonds indicating various decision points in the process. The processes including both rectangles and diamonds are interconnected to establish an order of the various decisions and actions to be taken. Based upon the disclosure provided herein, one of ordinary skill in the art will recognize a variety of network processes that may be used in relation to different embodiments including, but not limited to, hand-drawn decision charts, Lucid™ charts, and Microsoft™ Word™ charts.

Network process receiving module 151 determines whether the received network process is in a standardized form. A standardized form is any format that is known and for which a conversion module exists. Thus, for example, where the received network process is in Microsoft™ WORD™ format, and a module exists to translate from that format, the received network process is considered to be in a standardized form. Alternatively, where for the example the received network process is a hand-written flow diagram, the received network process is not considered to be in a standardized form.

Where the received network process is not in a standardized form, network process receiving module 151 applies a visual based conversion of the received network process is performed to convert the non-standard form to an intermediate form. Such a process includes performing a text recognition on text included in each rectangle to identify an action, and re-writing the action in the intermediate format. Similarly, the process includes performing a text recognition on text included in each diamond to identify a decision, and re-writing the decision in the intermediate format. The combination of the actions and decisions are assembled in the same order and dependency as that set forth in the received network process. In some embodiments, the intermediate format is a JavaScript Object Notation (JSON) format. Based upon the disclosure provided herein, one of ordinary skill in the art will recognize a variety of intermediate formats that may be used in relation to different embodiments.

Where the received network process is in a standardized form, network process receiving module 151 selects a conversion module specific to the standardized form of the received network process, and applies the selected conversion module to the received network process to convert it to the intermediate form. Network process receiving module 151 stores the resulting intermediate format to a memory.

Network process conversion module 152 is configured to convert the intermediate format created and stored by network process receiving module 151 into a manual SOAR playbook. To do this, network process conversion module 152 accesses the intermediate format. Network process conversion module 152 selects each process in the accessed intermediate form network process, and replaces the respective processes with corresponding manual SOAR instructions. Network process conversion module 152 stores the resulting manual SOAR instructions to a manual SOAR playbook.

Manual SOAR conversion module 153 is configured to convert the manual SOAR playbook to an automated SOAR playbook by replacing one or more of the manual SOAR instructions with a corresponding automated SOAR instruction. This automated SOAR playbook may then be triggered by an alert that would have triggered use of the original network process from which the automated SOAR playbook was derived.

Figure 1C:
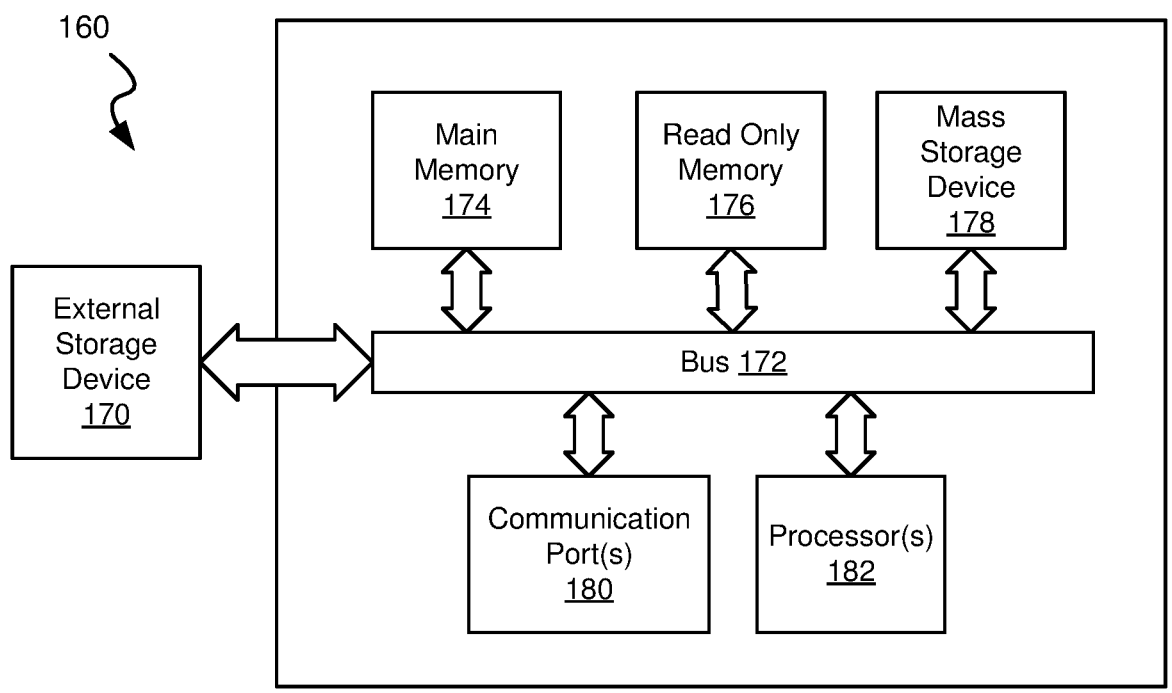

Turning to FIG. 1C, an example computer system 160 in which or with which embodiments of the present invention may be utilized is shown. In some case, one or more of node 104a or node 104b may be implemented to include the features of example computer system 160. As shown in FIG. 1B, computer system 160 includes an external storage device 170, a bus 172, a main memory 174, a read-only memory 176, a mass storage device 178, a communication port 180, and one or more processors 182.

Those skilled in the art will appreciate that computer system 160 may include more than one processor 182 and communication ports 180. Examples of processor 1820 include, but are not limited to, an Intel® Itanium® or Itanium 2 processor(s), or AMD® Opteron® or Athlon MP® processor(s), Motorola® lines of processors, Forti-SOC™ system on chip processors or other future processors. Processor 182 may include various modules associated with embodiments of the present invention.

Communication port 180 can be any of an RS-232 port for use with a modem-based dialup connection, a 10/100 Ethernet port, a Gigabit or 10 Gigabit port using copper or fiber, a serial port, a parallel port, or other existing or future ports. Communication port 180 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read-Only Memory 176 can be any static storage device(s) e.g., but not limited to, a Programmable Read-Only Memory (PROM) chips for storing static information e.g. start-up or BIOS instructions for processor 182.

Mass storage 178 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processor(s) 182 with the other memory, storage, and communication blocks. Bus 172 can be, e.g. a Peripheral Component Interconnect (PCI)/ PCI Extended (PCI-X) bus, Small Computer System Interface (SCSI), USB or the like, for connecting expansion cards, drives and other subsystems as well as other buses, such a front side bus (FSB), which connects processor 182 to a software system.

Optionally, operator and administrative interfaces, e.g. a display, keyboard, and a cursor control device, may also be coupled to bus 172 to support direct operator interaction with the computer system. Other operator and administrative interfaces can be provided through network connections connected through communication port 180. An external storage device 170 can be any kind of external hard-drives, floppy drives, IOMEGA® Zip Drives, Compact Disc-Read-Only Memory (CD-ROM), Compact Disc-Re-Writable (CD-RW), Digital Video Disk-Read Only Memory (DVD-ROM). The components described above are meant only to exemplify various possibilities. In no way should the aforementioned example computer system limit the scope of the present disclosure.

Figure 2:
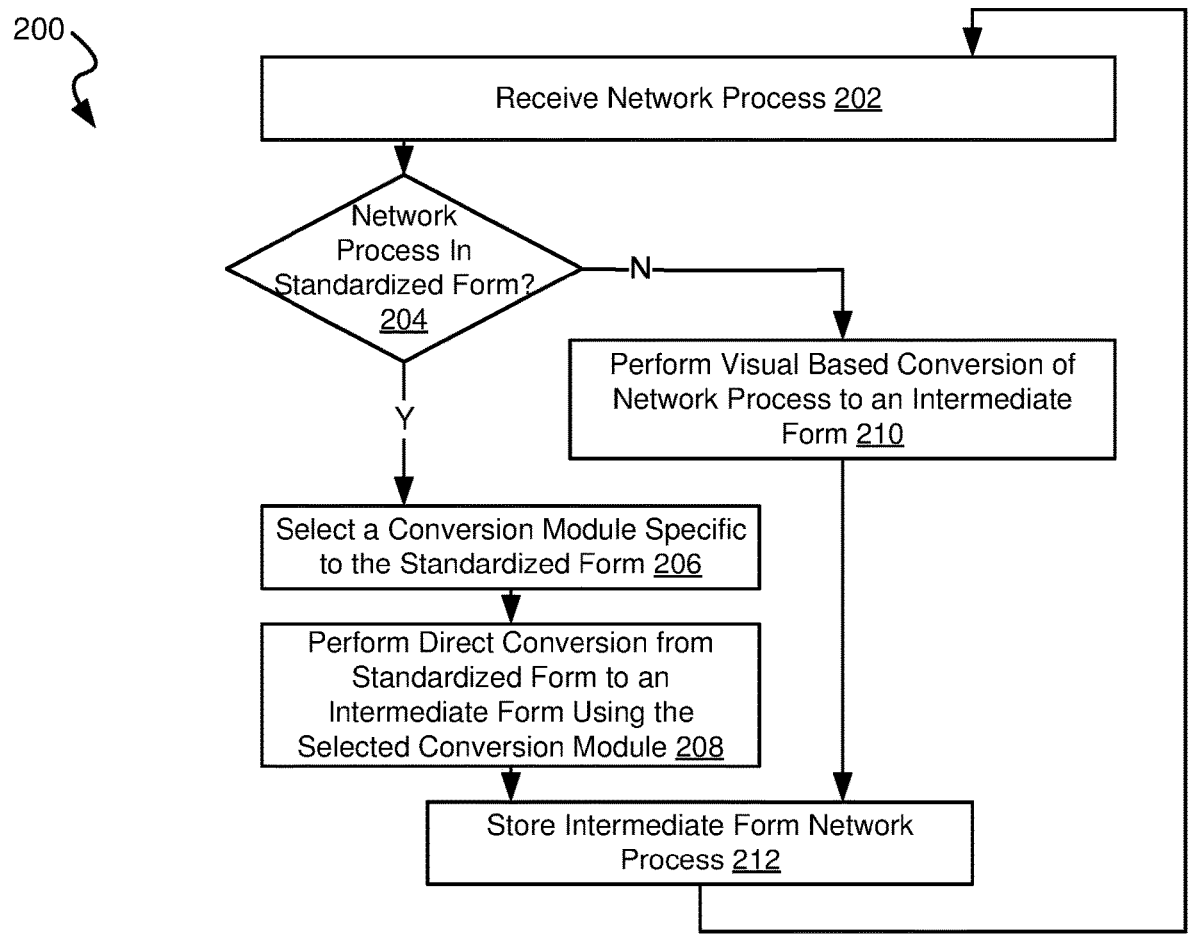
FIG. 2 is a flow diagram showing a method in accordance with some embodiments for receiving and converting a network process from one of a variety of input sources to an intermediate form.

Turning to FIG. 2, a flow diagram 200 shows a method in accordance with some embodiments for receiving and converting a network process from one of a variety of input sources to an intermediate form. Following flow diagram 200, a network process is received (block 202). The network process may be any set of instructions that are followed when a particular occurrence or set of occurrences are noted by a network administrator. As an example, the network process may be a Microsoft™ Visio™ flow chart having a number of rectangles indicating different steps to be taken and a number to diamonds indicating various decision points in the process. The processes including both rectangles and diamonds are interconnected to establish an order of the various decisions and actions to be taken. Based upon the disclosure provided herein, one of ordinary skill in the art will recognize a variety of network processes that may be used in relation to different embodiments including, but not limited to, hand-drawn decision charts, Lucid™ charts, and Microsoft™ Word™ charts.

Figure 3:
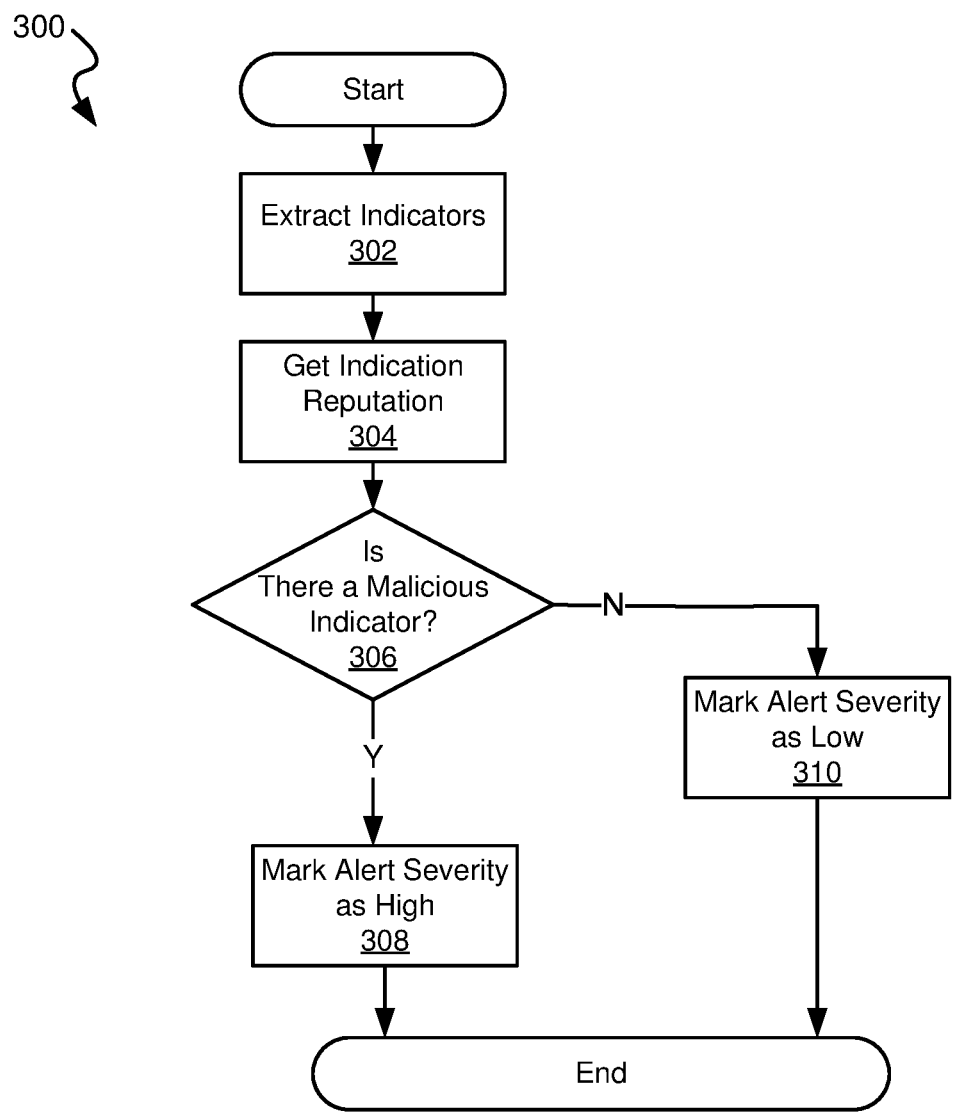
FIG. 3 is an example visual network process from which a SOAR playbook can be generated in accordance with various embodiments.

Turning to FIG. 3, an example visual network process 300 is shown. In this example, visual network process 300 is a hand-drawn flow chart including a number of actions (shown in rectangles) and a number of decisions (shown as diamonds) that are arranged in a particular order or execution. Following visual network process 300, indicators for a network alert are estracted (block 302). Such indicators may include, but are not limited to, time of day, machine(s) involved in the alert, memory usage of machine(s) involved in the alert, source of network alert, and the like. Based upon the disclosure provided herein, one of ordinary skill in the art will recognize a variety of indicators that may be extracted in relation to a particular network process.

An indication reputation is obtained (block 304). Such an indication reputation indicates a reputation of the received alert and/or one or more of the extracted indicators. In an example, the reputation may indicate that the alert is benign or malicious. Such an indication reputation may be accessed from any source of indication reputation that is available to the network process.

It is determined whether the indication reputation is a malicious indicator (block 306). Where it is a malicious indicator (block 306), the alert severity is marked as high (block 308). Otherwise, where it is not a malicious indicator (block 3060, the alert severity is marked as low (block 310).

Returning to FIG. 2, it is determined whether the received network process is in a standardized form (block 204). A standardized form is any format that is known and for which a conversion module exists. Thus, for example, where the received network process is in Microsoft™ WORD™ format, and a module exists to translate from that format, the received network process is considered to be in a standardized form. Alternatively, where for the example the received network process is a hand-written flow diagram similar to that discussed in FIG. 3, the received network process is not considered to be in a standardized form.

Where the received network process is not in a standardized form (block 204), a visual based conversion of the received network process is performed to convert the non-standard form to an intermediate form (block 210). Such a process includes performing a text recognition on text included in each rectangle to identify an action, and re-writing the action in the intermediate format. Similarly, the process includes performing a text recognition on text included in each diamond to identify a decision, and re-writing the decision in the intermediate format. The combination of the actions and decisions are assembled in the same order and dependency as that set forth in the received network process. In some embodiments, the intermediate format is a JavaScript Object Notation (JSON) format. Based upon the disclosure provided herein, one of ordinary skill in the art will recognize a variety of intermediate formats that may be used in relation to different embodiments.

Using FIG. 3 as an example: the text "extract indicators" in a rectangle would be automatically recognized and converted to an action "extract indicators" in the intermediate format; the text "get indication reputation" in a rectangle would be automatically recognized and converted to an action "get indication reputation" in the intermediate format; the text "mark alert severity as high" in a rectangle would be automatically recognized and converted to an action "mark alert severity as high" in the intermediate format; and the text "mark alert severity as low" in a rectangle would be automatically recognized and converted to an action "mark alert severity as low" in the intermediate format. The text "is there a malicious indicator?" in a diamond would be automatically recognized and converted to a decision "is there a malicious indicator?" in the intermediate format. The collection of converted decisions and actions is then assembled with the same ordering in the intermediate format as that included in the received network process.

Returning to FIG. 2, where the received network process is in a standardized form (block 204), a conversion module specific to the standardized form of the received network process is selected (block 206). As an example, where the received network process is in Microsoft™ WORD™ format, then a conversion module specific to Microsoft™ WORD™ format is selected. The selected module is then applied to the received network process to convert it to the intermediate form (block 208). Ultimately, the resulting intermediate form whether created by a visual based conversion of the network process (block 210) or by a selected conversion module specific to a given format (block 208), the intermediate format is stored (block 212).

Figure 4:
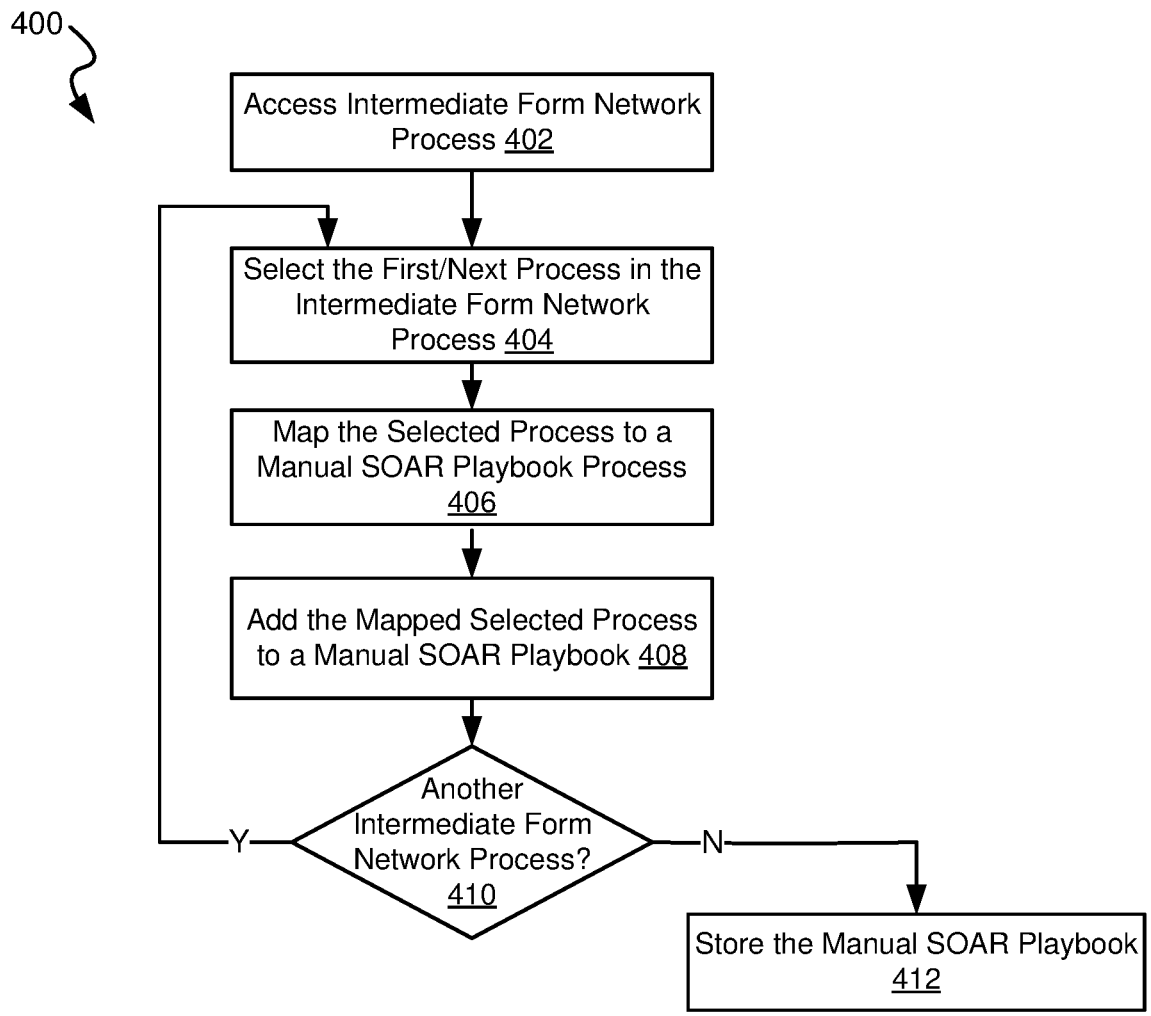
FIG. 4 is a flow diagram showing a method in accordance with some embodiments for transitioning an intermediate form into a manual SOAR playbook.

Turning to FIG. 4, a flow diagram 400 shows a method in accordance with some embodiments for transitioning an intermediate form into a manual SOAR playbook. Following flow diagram 400, an intermediate form of a network process is accessed (block 402). This can include, for example, accessing the intermediate format generated using the process of FIG. 2 from the memory where it is stored.

The first/next process in the accessed intermediate form network process is selected (block 404). Thus, using FIG. 3 as an example, the "extract indicators" action is selected from the accessed intermediate form network process. The selected process is then mapped so a manual SOAR playbook process (block 406), and the mapped selected process is added to a growing manual SOAR playbook (block 408).

It is determined whether there is another process in the intermediate form network process (block 410). Where another process remains (block 410), the processes of blocks 404-408 are repeated for the next process. This continues until no additional processes remain in the intermediate form network process (block 410). At this juncture all actions and decisions in the intermediate form network process have been mapped to a manual SOAR playbook which is stored to memory (block 412).

Figure 5:
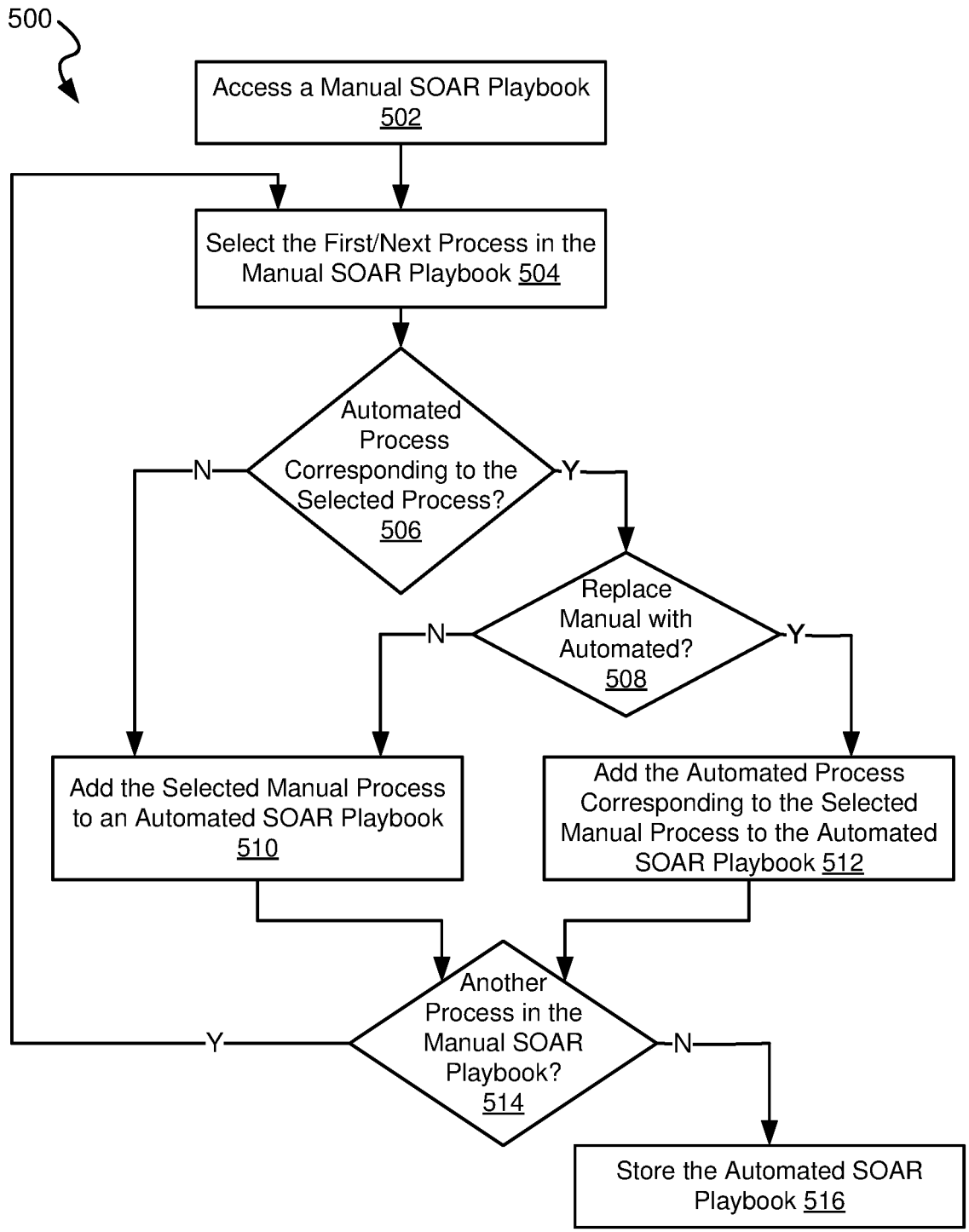
FIG. 5 is a flow diagram showing a method in accordance with various embodiments for generating an automated SOAR playbook from a manual SOAR playbook.

Turning to FIG. 5, a flow diagram 500 shows a method in accordance with various embodiments for generating an automated SOAR playbook from a manual SOAR playbook. Following flow diagram 500, a manual SOAR playbook is accessed (block 502). This can include, for example, accessing the manual SOAR playbook generated using the process of FIG. 4 from the memory where it is stored.

The first/next process in the accessed manual SOAR playbook is selected (block 504). Thus, using FIG. 3 as an example, the manual SOAR mapping of the "extract indicators" action is selected. It is determined whether an automated process exists for the selected manual SOAR instruction (block 506). Where an automated process exists (block 506), it is determined whether the manual process is to be replaced by the automated process (block 508). This may include, but not limited to, requesting that a user indicate whether the manual or the automated is desired.

Where the automated process is to be used (block 508), the automated process is added to a growing automated SOAR playbook (block 512). Otherwise (block 508), the manual process is included in the growing automated SOAR playbook (block 510). Similarly, where no automated process exists that corresponds to the selected process (block 506), the manual process is included in the growing automated SOAR playbook (block 510).

It is determined whether there is another process in the intermediate form network process (block 514). Where another process remains (block 514), the processes of blocks 504-514 are repeated for the next process. This continues until no additional processes remain in the manual SOAR playbook for consideration and processing (block 514). At this juncture all actions and decisions in the manual SOAR playbook have been converted to the automated SOAR playbook which is stored to memory (block 516).

In conclusion, the present invention provides for novel systems, devices, and methods. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for generating a Security Orchestration, Automation, and Response (SOAR) playbook for network security, the method comprising:
   receiving, by a processing resource, a visual representation of a network process;
   converting, by the processing resource, the visual representation of the network process to an intermediate format of Java Script Object Notation;
   mapping, by the processing resource, each element of the intermediate format to a manual SOAR operation to yield a manual SOAR playbook representing the network process;
   converting, by the processing resource, at least one element of the manual SOAR playbook to an automated SOAR operation to yield an automated SOAR playbook; and
   taking a security action from the automated SOAR operation of the automated SOAR playbook.

2. The method of claim 1, wherein converting the visual representation of the network process to the intermediate format uses a visual based conversion.

3. The method of claim 2, wherein the visual based conversion comprises:
   identifying, by the processing resource, a first shape on the visual representation of the network process;
   automatically recognizing, by the processing resource, a first text on the first shape;
   generating, by the processing resource, an action including the first shape and the first text; and
   including, by the processing resource, the action in the intermediate format.

4. The method of claim 3, wherein the first shape is a rectangle.

5. The method of claim 3, wherein the visual based conversion further comprises:
   identifying, by the processing resource, a second shape on the visual representation of the network process;
   automatically recognizing, by the processing resource, a second text on the second shape;
   generating, by the processing resource, a decision including the second shape and the second text; and
   including, by the processing resource, the decision in the intermediate format in a connected relationship with the action.

6. The method of claim 5, wherein the first shape is a rectangle.

7. The method of claim 1, wherein converting the visual representation of the network process to the intermediate format includes:
   identifying, by the processing resource, an electronic format of the visual representation of the network process;
   selecting, by the processing resource, a conversion module specific to the electronic format; and
   applying, by the processing resource, the selected conversion module to the visual representation of the network process to perform a non-visual conversion to the intermediate format.

8. A system for generating a Security Orchestration, Automation, and Response (SOAR) playbook for network security, the system comprising:
   a processing resource;
   a non-transient computer readable medium coupled to the processing resource and having stored therein instructions that when executed by the processing resource cause the processing resource to:
   receive a visual representation of a network process;
   convert the visual representation of the network process to an intermediate format of Java Script Object Notation;
   map each element of the intermediate format to a manual SOAR operation to yield a manual SOAR playbook representing the network process; and
   convert at least one element of the manual SOAR playbook to an automated SOAR operation to yield an automated SOAR playbook;
   wherein the processing resource takes a security action from the automated SOAR operation of the automated SOAR playbook.

9. The system of claim 8, wherein converting the visual representation of the network process to the intermediate format uses a visual based conversion.

10. The system of claim 8, wherein the visual based conversion comprises:
   identifying a first shape on the visual representation of the network process;
   automatically recognizing a first text on the first shape;
   generating an action including the first shape and the first text; and
   including the action in the intermediate format.

11. The system of claim 10, wherein the visual based conversion further comprises:
   identifying a second shape on the visual representation of the network process;
   automatically recognizing a second text on the second shape;
   generating a decision including the second shape and the second text; and
   including the decision in the intermediate format in a connected relationship with the action.

12. The method of claim 8, wherein converting the visual representation of the network process to the intermediate format includes:
   identifying an electronic format of the visual representation of the network process;
   selecting a conversion module specific to the electronic format; and
   applying the selected conversion module to the visual representation of the network process to perform a non-visual conversion to the intermediate format.

13. A non-transient computer readable medium including instructions that when executed by a processing resource cause a method for generating a Security Orchestration, Automation, and Response (SOAR) playbook for network security, comprising:
   receiving a visual representation of a network process;
   converting the visual representation of the network process to an intermediate format of Java Script Object Notation;
   mapping each element of the intermediate format to a manual SOAR operation to yield a manual SOAR playbook representing the network process;
   converting at least one element of the manual SOAR playbook to an automated SOAR operation to yield an automated SOAR playbook; and
   taking a security action from the automated SOAR operation of the automated SOAR playbook.

14. The non-transient computer readable medium of claim 13, wherein converting the visual representation of the network process to the intermediate format uses a visual based conversion.

15. The non-transient computer readable medium of claim 14, wherein the visual based conversion comprises:
   identifying a first shape on the visual representation of the network process;
   automatically recognizing a first text on the first shape;
   generating an action including the first shape and the first text;
   including the action in the intermediate format;
   identifying a second shape on the visual representation of the network process;
   automatically recognizing a second text on the second shape;
   generating a decision including the second shape and the second text; and
   including the decision in the intermediate format in a connected relationship with the action.

16. The non-transient computer readable medium of claim 15, wherein the first shape is a rectangle and the second shape is a diamond.

17. The non-transient computer readable medium of claim 14, wherein converting the visual representation of the network process to the intermediate format includes:
   identifying an electronic format of the visual representation of the network process;
   selecting a conversion module specific to the electronic format; and
   applying, by the processing resource, the selected conversion module to the visual representation of the network process to perform a non-visual conversion to the intermediate format.

* * * * *